(12) United States Patent
Tiell et al.

(10) Patent No.: US 10,599,679 B2
(45) Date of Patent: Mar. 24, 2020

(54) PLATFORM DATA AGGREGATION AND SEMANTIC MODELING

(71) Applicant: Accenture Global Solutions Limited, Dublin (IE)

(72) Inventors: Steven C. Tiell, San Francisco, CA (US); Edy S. Liongosari, San Jose, CA (US); Chetan R. Kundavaram, Fremont, CA (US); Shimon Modi, San Francisco, CA (US)

(73) Assignee: Accenture Global Solutions Limited, Dublin (IE)

( * ) Notice: Subject to any disclaimer, the term of this patent is extended or adjusted under 35 U.S.C. 154(b) by 293 days.

(21) Appl. No.: 15/093,344

(22) Filed: Apr. 7, 2016

(65) Prior Publication Data
US 2017/0053015 A1    Feb. 23, 2017

Related U.S. Application Data

(60) Provisional application No. 62/206,078, filed on Aug. 17, 2015.

(51) Int. Cl.
*G06F 16/22* (2019.01)
*G06F 16/28* (2019.01)
(Continued)

(52) U.S. Cl.
CPC .......... *G06F 16/285* (2019.01); *G06F 16/113* (2019.01); *G06F 16/162* (2019.01);
(Continued)

(58) Field of Classification Search
CPC ................ G06Q 30/02; G06Q 30/0641; G06F 17/30528; G06F 17/30598
See application file for complete search history.

(56) References Cited

U.S. PATENT DOCUMENTS 8,413,251 B1  4/2013  Gibney et al.
8,805,699 B1  8/2014  Lang
(Continued)

FOREIGN PATENT DOCUMENTS

WO    WO 2016063092    4/2016

OTHER PUBLICATIONS

Sir Isaac Newton "Internet of Things IoT Semantic interoperability: Research Challenges, Best Practices, Recommendations and Next Steps" European Research Cluster on the Internet of Things, Mar. 2015.*

(Continued)

*Primary Examiner* — Apu M Mofiz
*Assistant Examiner* — Cindy Nguyen
(74) *Attorney, Agent, or Firm* — Fish & Richardson P.C.

(57) ABSTRACT

Techniques are described for aggregating data generated by multiple platforms of different types. A particular user (e.g., end-user) may interact with multiple individual (e.g., siloed) platforms of different types and/or that support different business purposes or industries. The individual platforms may generate data describing and/or resulting from these interactions. The data may be received, ingested, and processed by a super-platform. The super-platform may generate aggregate data by aggregating the data received from different individual platforms. Data aggregation may be performed on data that is generated by different individual platforms and that is associated with a particular user or multiple users. Aggregation may also be performed on data that is independent of any particular user, such as sensor data that describes an environment in proximity to the platform.

20 Claims, 5 Drawing Sheets

(51) Int. Cl.
  *G06F 16/29*    (2019.01)
  *G06F 16/11*    (2019.01)
  *G06F 16/16*    (2019.01)
  *G06F 16/9535*  (2019.01)
  *G06F 16/2457*  (2019.01)
  *G06F 21/62*    (2013.01)
  *G06Q 30/06*    (2012.01)
  *G06Q 30/02*    (2012.01)
  *H04L 12/26*    (2006.01)
  *H04L 29/08*    (2006.01)

(52) U.S. Cl.
  CPC ........ *G06F 16/22* (2019.01); *G06F 16/24575* (2019.01); *G06F 16/29* (2019.01); *G06F 16/9535* (2019.01); *G06F 21/6227* (2013.01); *G06F 21/6236* (2013.01); *G06Q 30/0201* (2013.01); *G06Q 30/0601* (2013.01); *G06Q 30/0631* (2013.01); *H04L 43/04* (2013.01); *H04L 43/0876* (2013.01); *H04L 67/22* (2013.01)

(56) References Cited

U.S. PATENT DOCUMENTS

| | | |
|---|---|---|
| 2002/0099643 A1 | 7/2002 | Abeshouse |
| 2007/0103984 A1 | 5/2007 | Kavuri et al. |
| 2009/0037355 A1 | 2/2009 | Brave |
| 2009/0224941 A1 | 9/2009 | Kansal |
| 2009/0228397 A1 | 9/2009 | Tawakol et al. |
| 2011/0054934 A1 | 3/2011 | Vesto |
| 2011/0276423 A1 | 11/2011 | Davidson |
| 2012/0054680 A1 | 3/2012 | Moonka et al. |
| 2012/0197856 A1 | 8/2012 | Banka et al. |
| 2012/0290950 A1 | 11/2012 | Rapaport |
| 2012/0303736 A1 | 11/2012 | Novotny et al. |
| 2013/0197968 A1 | 8/2013 | Davis |
| 2013/0204669 A1 | 8/2013 | Percy |
| 2014/0180826 A1 | 6/2014 | Boal |
| 2014/0244399 A1 | 8/2014 | Orduna et al. |
| 2014/0344015 A1 | 11/2014 | Puertolas-Montanes et al. |
| 2015/0019342 A1 | 1/2015 | Gupta |
| 2015/0019714 A1 | 1/2015 | Shaashua et al. |
| 2015/0220734 A1 | 8/2015 | Nalluri et al. |
| 2016/0306689 A1 | 10/2016 | Jain |
| 2017/0032248 A1 | 2/2017 | Dotan-Cohen |
| 2017/0046806 A1 | 2/2017 | Haldenby et al. |
| 2017/0053032 A1 | 2/2017 | Tiell et al. |
| 2017/0053131 A1 | 2/2017 | Modi et al. |
| 2017/0053295 A1 | 2/2017 | Tiell et al. |
| 2017/0054611 A1 | 2/2017 | Tiell et al. |

OTHER PUBLICATIONS

Alex et al. "Semantic Web of Things: an analysis of the application semantics for the IoT moving towards the IoT Convergence" in International Journal of Web and Grid Service, Apr. 2014.*
U.S. Notice of Allowance for U.S. Appl. No. 15/095,481, dated Jan. 22, 2018, 24 pages.
U.S. Non-Final Office Action for U.S. Appl. No. 15/093,374, dated Oct. 26, 2018, 20 pages.

* cited by examiner

PLATFORM DATA AGGREGATION AND SEMANTIC MODELING

CROSS-REFERENCE TO RELATED APPLICATION

This application claims priority to U.S. Provisional Patent Application Ser. No. 62/206,078 filed on Aug. 17, 2015, titled "Super-Platform," which is hereby incorporated by reference in the entirety.

BACKGROUND

With the rapid growth of ubiquitous computing and the Internet of Things (IoT), users are interacting with many different computing systems in the course of their lives. In addition to interacting with devices whose primary function is computing, such as home computers, mobile computing devices, and so forth, users may also interact with devices that include computers as components, such as smart appliances, automotive computers, or any number of IoT devices. The various computing devices may generate data regarding users, and such data may be generated and delivered using different formats, models, or communications channels.

SUMMARY

Implementations of the present disclosure are generally directed to data aggregation and semantic modeling. More specifically, implementations are directed to receiving and aggregating, at a super-platform, data generated by multiple individual platforms of various types, and determining semantic models that describe the data generated by the individual platforms.

In general, innovative aspects of the subject matter described in this specification can be embodied in methods that includes actions of: receiving data objects generated by a plurality of platforms that provide at least two different types of services; based at least partly on metadata that describes one or more of the data objects, aggregating at least some of the data objects from the plurality of platforms to generate one or more aggregate data objects; and providing the one or more aggregate data objects to at least one data consumer device.

Implementations can optionally include one or more of the following features: one or more of the data objects include data associated with an end-user of one or more of the plurality of platforms; the actions further include determining that a particular data object from one of the plurality of platforms includes data not included in other data objects from other platforms; the actions further include including the particular data object in the at least some of the data objects that are aggregated to generate the one or more aggregate data objects; the actions further include normalizing the data from different platforms of the plurality of platforms to provide one or more of a common data format, a common data style, or a common data type for the data; at least two platforms of the plurality of platforms generate data associated with a same end-user; the at least two platforms employ at least two different user identifiers to identify the same end-user; normalizing the data further includes associating a common user identifier with the data generated by the at least two platforms; at least a portion of the metadata is received from one or more of the plurality of platforms; the actions further include generating at least a portion of the metadata based on one or more of a natural language analysis of the data, a pattern matching analysis of the data, or context information associated with one or more of the plurality of platforms or an end-user of the plurality of platforms; the plurality of platforms include at least two of an e-commerce platform configured to provide an e-commerce service, a retail platform configured to support retail operations of a physical store, a media platform configured to provide an online media service, a mobile computing device, an Internet of Things (IoT) computing device, or an in-vehicle computer; the actions further include analyzing data included in one or more of the data objects to determine a semantic data model for one of the plurality of platforms; the actions further include employing the semantic data model in aggregating at least some of the data objects from the plurality of platforms to generate the one or more aggregate data objects; the actions further include receiving an indication of a newly available platform configured to provide data; and/or the actions further include based at least partly on a similarity between the newly available platform and one of the plurality of platforms, determining a semantic data model for the newly available platform.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Implementations provide the following advantages. By following the "platform of platforms" approach described herein, implementations achieve greater scalability than traditional data processing systems. Implementations provide for clean data sets and lifelong provenance, achieved through the automated integration and addition of metadata to new and existing data assets. Implementations also provide for extensible in-flight analytics, which can also function as a platform, allowing for third party developers to publish models and algorithms. Moreover, implementations provide aggregation features that allow for on-the-fly assembly of data assets based upon requirements. Implementations also provide the ability to autonomously scrub data prior to sharing, to minimize and/or eliminate re-identification risks. Moreover, because implementations provide greater scalability, clean data sets, and the other advantages described above, the super-platform makes more efficient use of processing capacity, memory, storage capacity, network bandwidth, and/or other computing resources compared to traditional systems.

It is appreciated that aspects and features in accordance with the present disclosure can also include any combination of the aspects and features described herein. That is, aspects and features in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the

DESCRIPTION OF DRAWINGS

Like reference symbols in the various drawings indicate like elements.

DETAILED DESCRIPTION

Implementations of the present disclosure include systems, devices, methods, and computer-readable media for aggregating data generated by multiple platforms of different types. A particular user (e.g., end-user) may interact with multiple individual (e.g., siloed) platforms of different types or that support different business purposes or industries. The individual platforms may generate data describing and/or resulting from these interactions. In accordance with the present disclosure, the data may be received, ingested, and processed by a super-platform. The super-platform may aggregate the data that is generated by different individual platforms. Data aggregation may be performed on data that is generated by different individual platforms and that is associated with a particular user or multiple users. Aggregation may also be performed on data that is independent of any particular user, such as sensor data that describes an environment in proximity to the platform.

In some implementations, the aggregate data generated through the data aggregation process may be distributed to one or more data consumers, who may employ the aggregate data to gain insights into the end-users' behavior, characteristics, activities (e.g., shopping or browsing habits), or interests. In some examples, the data consumer(s) may employ the aggregate data to determine advertising content or market strategies to target particular, individual end-users or sets (e.g., segments) of end-users with particular characteristics. In some examples, the data consumer(s) may interact with a marketplace that is associated with the super-platform, and request one or more sets of aggregate data corresponding to various search criteria. In some examples, the aggregate data may be distributed using a content distribution network (CDN) having multiple distribution nodes.

In some implementations, various types of entities (e.g., individuals, computing devices, processes, etc.) may interact with the super-platform. Such entities may include data disclosers, data manipulators, and data consumers. A data discloser may be any entity that generates and/or provides the data to the super-platform. A data discloser may also be any entity that causes the data to be generated and/or provided to the super-platform. For example, an end-user of individual platform(s) may be a data discloser. An individual platform may also, itself, be a data discloser. A data manipulator may be any entity that analyzes, aggregates, and/or otherwise processes the data. For example, the super-platform and/or the various processes executing on the super-platform may be described as data manipulators. In some instances, the individual platforms and/or end-users may be data manipulators as well as possibly data disclosers, e.g., in scenarios where the data discloser manipulates the data in some way prior to disclosing the data to the super-platform. A data consumer may be any entity that receives the data and/or any information that is generated through manipulation of the data (e.g., aggregate data, analysis results, etc.). A data consumer may purchase or otherwise acquire information from the super-platform. In some instances, a data consumer may also be a data manipulator and/or data discloser. For example, a data consumer may purchase a set of data from the super-platform, analyze (e.g., manipulate) the data to produce analysis result(s) and/or other data set(s), and sell (e.g., disclose) the analysis result(s) and/or other data set(s) to the super-platform, individual platform(s), and/or other entities. Accordingly, a particular entity may operate in accordance with one or more of the roles of data discloser, data manipulator, and/or data consumer depending on the particular circumstances.

Figure 1:
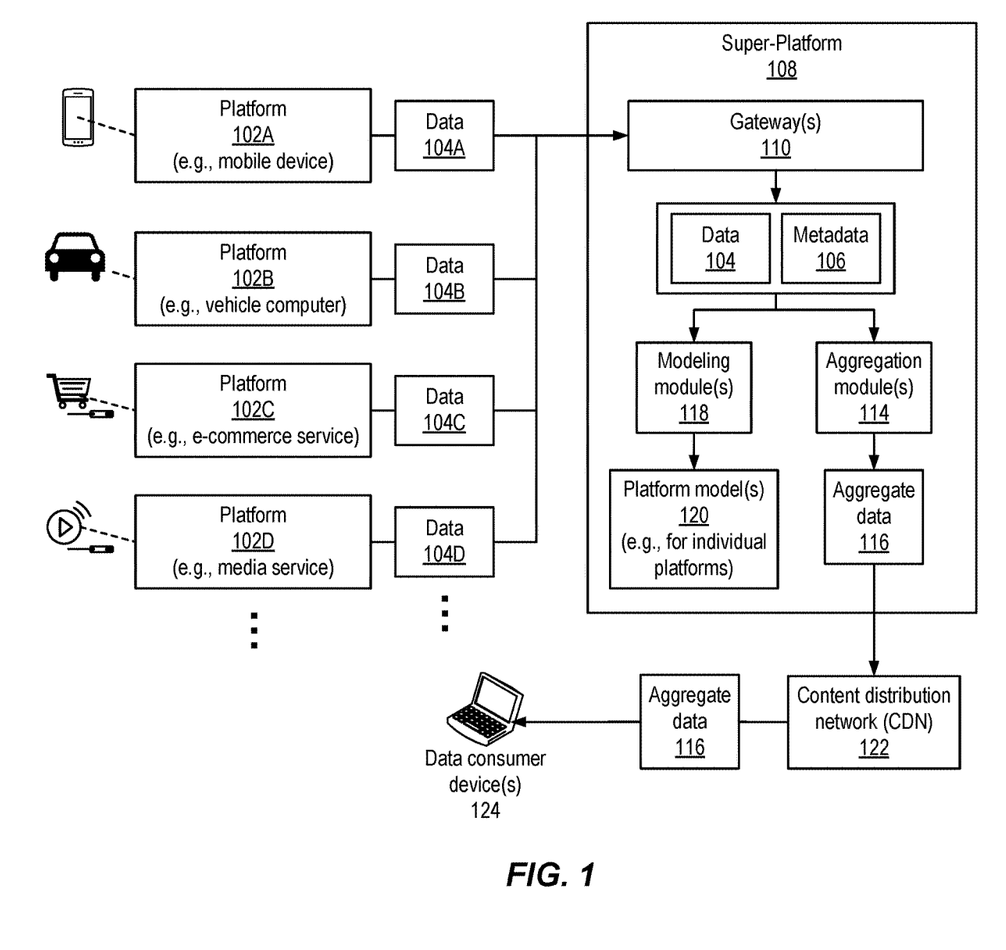
FIG. 1 depicts an example system for aggregating data received from multiple data generating platforms, in accordance with implementations of the present disclosure.

FIG. 1 depicts an example system for aggregating data received from multiple data generating platforms, in accordance with implementations of the present disclosure. A particular user may interact with multiple, different individual platforms 102. Each of the individual (e.g., siloed) platforms 102 may generate data 104 describing the user's interactions with the platform 102. In some implementations, the individual platforms 102 may include or provide different types of services, or may be different types of platforms that support businesses or other organizations in different types of industries. The platforms 102 may include, but are not limited to, one or more of the following:

A computing device, which may be a mobile or portable computing device such as a smartphone, tablet computer, notebook computer, personal data assistant (PDA), wearable computer (e.g., watch device or glasses device), and so forth;

An in-vehicle (e.g., automotive) computer that is a component of a commercial or personal-use vehicle or otherwise in communication with a vehicle, the in-vehicle computer configured to collect telematics data, data regarding the operations (e.g., speed, braking, gas mileage, etc.) of the vehicle, characteristics of the vehicle (e.g., temperature, fuel status, fluid status, etc.), location information, environment information (e.g., temperature, air pressure, etc.), and so forth;

Online services for streaming or otherwise delivering content over a network (e.g., the internet), such as video content, audio content (e.g., music), audio-visual content (e.g., films, television, etc.), games, graphics, images, or other media;

Online shopping or other e-commerce services that offer products or services via a web site, a native application, or other type of interface; Computing systems, such as point-of-sale terminals, servers, data storage devices, and so forth that are associated with physical (e.g., brick-and-mortar) stores or other commercial enterprises, the computing systems collecting or otherwise generating data based on in-store customer activities;

Internet-of-things (IoT) computing devices, such as smart appliances, home entertainment devices, or other devices present in a home, business setting, or elsewhere, and configured to include processing, memory, and communications capabilities in a device used for other purposes, such as smart washing machines, heating and air conditioning systems, audio or video presentation systems, and so forth; and An analytics cloud or other distributed computing system, such as a social media analytics cloud (SMAC).

A platform 102 may include a technical (e.g., hardware and/or software) architecture, governance rules, and one or more technology services that support the creation and execution of applications. Such applications may be specific to a particular industry associated with the platform 102. For example, platforms 102 that are vehicle computing systems, brick-and-mortar retail support systems, health care provider systems, or health insurance portals may provide and support applications associated with vehicle operations, retail operations, health care operations, or health insurance operations respectively. A platform 102 may provide a blueprint for how a business or other organization may build, connect, and deliver applications specific to problems in their associated industry. A platform 102 may serve as a pool of reusable functionality and capabilities to make building and evolving applications fast and easy, and may help companies or other organizations achieve better business outcomes. A platform 102 may also serve as a business model strategy that creates competitive differentiation. In a platform-based business, others outside a company may create value for the enterprise and, in some examples, enable new digital models for the company.

A platform 102 may include any number of applications (e.g., apps), and service layers or plug-in modules that support one or more features. Example features include financial transactions, authentication, logon, navigation, search, advertisement, marketplaces, or any other appropriate feature. An individual platform 102 may include hardware, software, or both hardware and software components. For example, a platform 102 that is an in-vehicle (e.g., telematics) computing system may include hardware components such as processor(s), memory, network interfaces, and so forth, as well as software components such as an operating system, firmware, or any number of applications or processes executing on the hardware component(s). As another example, a platform 102 that is an e-commerce or media streaming service may include a web site or application that executes on a computing device, to enable an end-user to view content or interact with the platform through a user interface (UI).

The individual platforms 102 may each generate data 104 that is associated with end-user(s), such as data describing user identity, user characteristics, user activities, user purchases, content browsed by the user, and so forth. In some examples, the data may be provided by the user, or may be generated based on user activities through the platform. The data 104 may include personally identifiable information (PII) of the end-user, such as user name, addresses, telephone numbers, login information to the individual platform 102, or other information that may enable identification of the particular user or that is particularly associated with a user. The data 104 may also include other types of information that are associated with the particular end-user, but not necessarily explicitly provided by the user, such as information describing user characteristics (e.g., demographic characteristics), user activities on the platform 102, user purchase history, browsing data, and so forth. In some examples, collected data 104 may include data that is generated by an individual platform 102, but not specific to a particular end-user. For example, an individual platform 102 that is a vehicle may provide data 104 that is collected by sensors of the vehicle, such as data describing temperature, air pressure, location, velocity, vehicle operational state, or other information. As another example, a platform 102 that is a computing device may generate and provide data 104 describing the location of the device, used and available memory capacity, used and available processing capacity, installed or executing applications, or other information that is not specifically associated with an end-user.

The data 104 generated by the platform(s) 102 may include any number of data objects. As used herein, a data object may include any size or amount of data that is arranged according to any format, or unformatted. A data object may include data of any type, and may include data that is compressed or uncompressed, encrypted or unencrypted. Data object(s) may have a particular size when communicated. Data object(s) may also include a stream of data that may continue for any duration to communicate any amount of data until the end of the stream. Data object(s) may be communicated in a sequence corresponding to an order of the data included in the data object(s). The data object(s) may also be communicated out of sequence, and may include sequence indicators or order indicators that enable a receiving process to reorder the received data object(s) into the order in which they were generated.

The data 104 generated by the individual platforms 102 may be sent to a (e.g., centralized) super-platform 108. For each individual platform 102, the super-platform 108 may include a gateway 110 that operates as an interface to receive the data 104 from the individual platform 102. The super-platform 108 may store the data 104, and may perform operations on the data 104 to process, store, analyze, aggregate, or otherwise handle the data 104. The super-platform 108 may include any number of software modules executing on any number of computing devices. For example, the super-platform 108 may be implemented as a cluster or other group of server computers configured to execute gateway(s) 110, aggregation module(s) 114, modeling module(s) 118, or other software module(s) that provide and support a super-platform service to ingest data 104, aggregate or otherwise process the data 104, and deliver aggregate data 116 or other information to data consumer(s).

In some implementations, the super-platform 108 may include one or more aggregation modules 114 that aggregate the data 104 to generate aggregate data 116. Data aggregation may aggregate data 104 associated with a single user of one or more platforms 102. Data aggregation may also aggregate data 104 from multiple users. For example, data aggregation may generate data sets for particular segments of users, such as users having particular demographic characteristics, location, demonstrated interest in products or services, and so forth. Aggregate data 116 may include, or be generated based on, data that describes or identifies users, such as PIT for one or more users. Aggregate data 116 may also include, or be generated based on, data that is not associated with users, such as sensor data. The aggregation module(s) 114 may aggregate data 104 received from different platforms 102 that support different types of operations or that are associated with different industries. For example, the super-platform 108 may aggregate data 104 from an end-user's smartphone, from a brick-and-mortar retail business where the end-user shops, from the end-user's in-vehicle telematics device, and from a streaming video service used by the end-user.

In some implementations, the super-platform 108 may identify aspects of the ingested data 104 that are more valuable, important, or significant than other data (e.g., "top ten customer information"). The aggregation module(s) 114 may aggregate at least those portions of the data 104. This may include data 104 that is rare, such as data 104 that is only available from a single individual platform 102 and not from other platform(s) 102. In some examples, the nature of the data 104 may indicate its importance. For example, data 104 related to safety at a nuclear reactor may be identified as important enough for aggregation. In some examples, all the ingested data 104 is aggregated, given that a data's importance may not be known at the time of ingestion and aggregation. In some examples, the super-platform 108 may not treat data 104 differently based on its source. For example, data 104 from various platforms 102 may be aggregated or otherwise handled similarly regardless of the type of platform, the size of the platform (e.g., based on amount of data generated), or other characteristics of the platforms 102.

In some implementations, data 104 may be tagged or otherwise associated with metadata 106 that describes various aspects of the data 104. For example, a temperature value in the data 104 may be associated with metadata 106 identifying that particular portion of data 104 as a temperature value, or the metadata 106 may indicate the unit of measure of that portion of data 104. In some examples, metadata 106 may describe the source of the data 104, such as the individual platform 102 that generated the data 104, the particular end-user whose interactions with the individual platform 102 caused the generation of the data 104, and so forth. The metadata 106 describing the source platform 102 may enable the super-platform 108 to perform various (e.g., unique or targeted) functions with regard to the data 104. For example, metadata 106 identifying the source platform 102 may enable the data 104 to be retracted from use, or recalled from distribution, if it is later determined that the data 104 from the platform 102 is inaccurate in some way. Metadata 106 may also identify a particular hardware or software component of the platform 102 that generated the data 104. For example, after ingestion of data 104 the individual platform 102 that supplied the data 104 may determine that a particular sensor that generated the data 104 is faulty, and the platform 102 may request that the super-platform 108 prevent further use of data 104 from that particular sensor. As another example, the super-platform 108 may perform operations to remove the faulty data 104 from aggregate data 116, statistically correct for the inclusion of faulty data 104, or other operations, such as to offset a calibration abnormality of the sensor.

For a particular portion of data 104, the super-platform 108 may determine as much metadata 106 as possible to describe the data 104. In this way, the super-platform 108 may be described as a metadata-rich environment that enables the data 104 to be interrogated or otherwise analysis in various ways, even in ways not anticipated when the data 104 was generated or received at the super-platform 108. Metadata 106 may indicate a source of the data 104, such as one or both of the end-user or individual platform 102 that generated the data 104. Metadata 106 may also indicate an owner of the data 104 at various stages in the data lifecycle of generation. The data lifecycle may include: ingestion by the super-platform 108; processing (e.g., analysis, aggregation, etc.); storage; distribution to data consumer(s); and deletion or retirement of the data 104. In some implementations, the metadata 106 is formatted according to a Resource Description Framework (RDF) or any other metadata format.

In some implementations, an individual platform 102 may provide metadata 106 with the data 104 that is ingested into the super-platform 108. In examples where an individual platform 102 does not provide metadata 106, or provides incomplete metadata 106, the super-platform 108 may generate metadata 106 for the ingested data 104. This generation of metadata 106 may be via a natural language (NL) or semantic analysis of the ingested data 104. In some examples, the super-platform 108 may generate metadata 106 such as location tags or time tags for the ingested data 104, e.g., based on other information indicating a location of the platform 102 or a time when the metadata 106 was generated or received. In some examples, the super-platform 108 may infer or otherwise determine metadata 106 for a portion of data 104 based on a semantic or format-based analysis of the data 104 to match the data 104 with one or more known patterns or formats of data. For example, if the data matches a known pattern or format for (e.g., "looks like") a value for air pressure, the data 104 may be tagged as air pressure data. The super-platform 108 may also add metadata 106 based on context information that is known about the individual platform 102 or the end-user.

In some examples, the super-platform 108 may also flag data 104 that the super-platform 108 is unable to reliably tag automatically with an adequate degree of confidence in the tagging. The flagging of data 104 that cannot be tagged may lead to a manual review and manual determination of metadata 106 for the data 104. In some examples, metadata tagging may be performed at a higher level or with less detail describing the data 104. For example, it may be sufficient to know that a particular portion of data 104 is describing a movie, without knowing which particular aspect (e.g., title, genre, plot synopsis, cast, etc.) is being described by the data 104.

In some implementations, data ingestion includes the normalization of data 104 received from different individual platforms 102. Such normalization may impose a common format for the metadata 106, or for the data 104 itself, in situations where different individual platforms 102 provide data 104 or metadata 106 in different formats, styles, data types, and so forth. Normalization may also include determination that different sets of data 104 from different individual platforms 102 are associated with the same end-user, in instances where the different individual platforms 102 employ a different user identifier for the end-user. In such examples, normalization may generate or alter metadata 106 to use a same user identifier to identify the same end-user. Normalization may normalize data 104 received from different countries or other geographical regions, to normalize the data 104 or metadata 106 to employ a same system of measurement, language, or other format.

In some implementations, the super-platform 108 may determine and employ a semantic data model that describes the ingested data 104 for a single platform 102 or for multiple platforms 102. The semantic data model may sit on top of the metadata 106 and provide a framework or set of relationships that describes multiple portions of data 104 having different metadata 106. For example, a semantic data model may describe a movie and may describe relationships between differently metadata-tagged portions of data, such as a relationship between movie title, description, cast, studio, format, length, genre, and so forth. The semantic data model may be described as a structure or map of the data 104, and may be determined based on the metadata 106. In some examples, the semantic data model may be hierarchical. For example, data 104 describing a refinery may include multiple gauges, valves, or other components, and those components may have sub-components, which may themselves have sub-components, and so forth.

Figure 2:
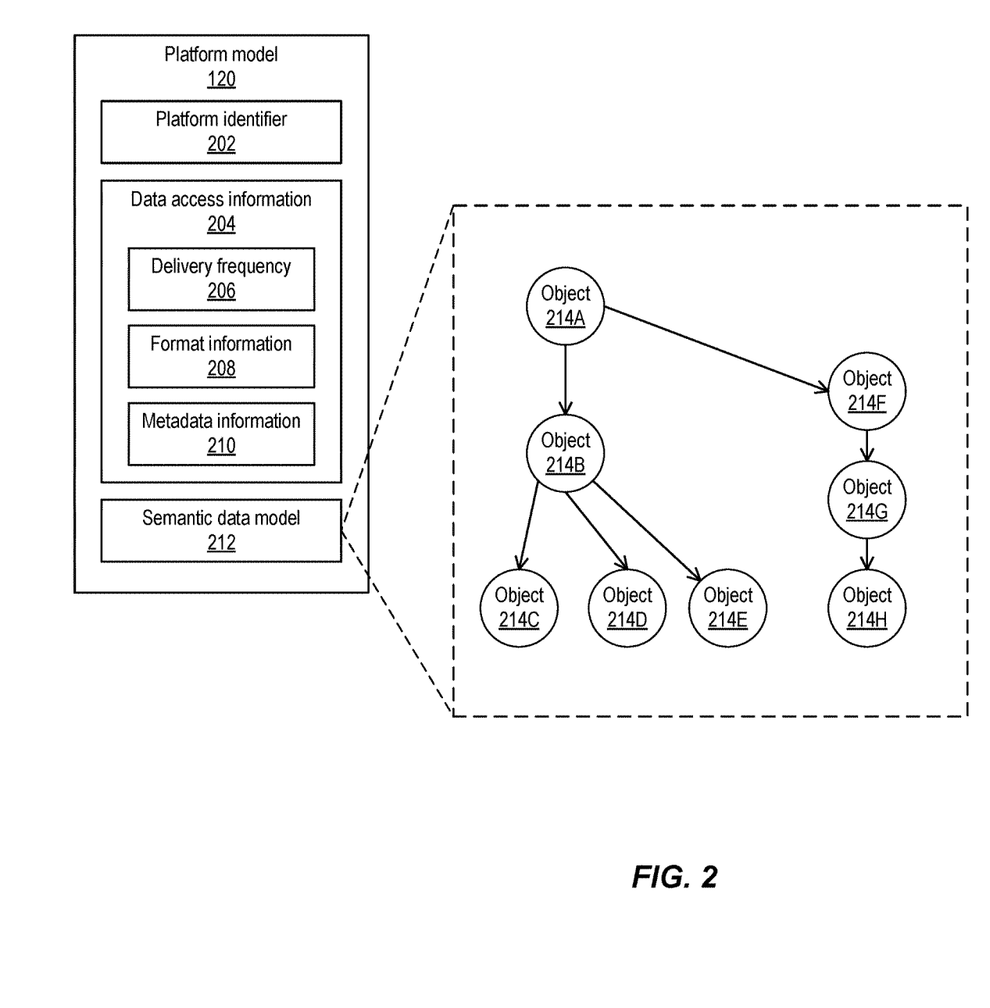
FIG. 2 depicts an example schematic of a platform model, including a semantic data model, in accordance with implementations of the present disclosure.

In some implementations, the super-platform 108 may execute one or more modeling modules 118 that analyze the data 104 and the metadata 106 to determine one or more platform models 120. In some examples, a platform model 120 may be determined for each of one or more of the platforms 102. FIG. 2 depicts an example schematic of a platform model 120, which may include a semantic data model 212. As shown in the example of FIG. 2, the platform model 120 may include a platform identifier 202 that identifies a particular platform 102 or set of platforms 102. The platform identifier 202 may be a name, network address, domain name, or other information that (e.g., uniquely) identifies a platform 102 or set of platforms 102.

In some implementations, the platform model 120 may include data access information 204 that provides a description of how to access the data 104 generated by a platform 102. For example, the data access information 204 may indicate that data from one or more platforms 102 is to be accessed using a batch file, an application programming interface (API), or other mechanism. The super-platform 108 may determine the capabilities of an individual platform 102, such as how frequently the individual platform 102 is able to provide data 104, the format of the provided data 104, or whether the individual platform 102 includes metadata 106 with the provided data 104. Such information may be included in the data access information 204 as delivery frequency 206, format information 208, and metadata information 210 respectively.

The super-platform 108 may create a mapping of the data 104 generated by an individual platform 102 or set of platforms 102. Such a mapping may be included as a semantic data model 212 in the platform model 120. As shown in the example of FIG. 2, the semantic data model 212 may describe any number of data objects 214, and may describe relationships between pairs of the objects 214 depicted as directed arrows in FIG. 2. Accordingly, the semantic data model 212 may be described as a graph or directed graph of relationships between data objects 214. Each relationship may be an "is-a" relationship, such that one object 214 is an instance of a higher-level data object 214. For example, an object 214 describing a truck may be related to an object describing a vehicle, given that a truck is a type of vehicle. A relationship may also be a "has-a" relationship, such that one object 214 is included in another object 214. For example, an object 214 that is a film may include one or more other objects 214 describing the title, run time, genre, release year, studio, director, cast, format, or other aspects of the film. A semantic data model 212 may describe any number of objects 214, arranged according to any number or type of relationships between the objects 214.

In some implementations, the semantic data model 212 is employed by the aggregation module(s) 114 during aggregation of data 104. For example, the various metadata 106 and relationships between data 104 having particular metadata 106 tags may be used to determine which portions of different sets of data 104 are to be aggregated to generate the aggregate data 116.

In some implementations, the super-platform 108 automatically generates the semantic data model 212 based on ingested data 104. In some implementations, the super-platform 108 may expose a UI with various tools to enable an operator to manually specify the semantic data model 212 for data 104. In some implementations, the semantic data model 212 is adapted from the associated metadata 106, depending on the source data 104.

Returning to FIG. 1, the super-platform 108 may be configured to dynamically adapt to the addition of new individual platforms 102 by determining how the data 104 provided by a new individual platform 102 fits into an existing semantic data model 212 that describes previously ingested data 104 from other platform(s) 102. Capabilities of the newly added individual platform 102 may be determined by analogizing or otherwise comparing to the new platform 102 to existing, similar individual platforms. For example, a new platform 102 may be associated with the semantic data model 212 of a currently supported platform 102 that is similar to the new platform 102 with regard to type of platform, hardware or software configuration, type of service provided by the platform, data access information 204, or other characteristics of the platforms.

In some implementations, machine learning may be employed to determine the semantic data model 212 and other capabilities of a newly available platform 102. Machine learning algorithm(s) may examine data sets that are sufficiently described by metadata 106 and, using the metadata 106, may apply a semantic data model 212 to a new data set from a new platform 102 that might extend, augment, improve, or stand alongside an existing data set from current platform(s) 102.

In some examples, similarity confidence levels between new and current data sets may be assigned on ingest of a new data set. For example, a new data set may be determined to be 89% similar to a current data set generated by a platform 102 for a commercial beer brewing operation. Based on that degree of similarity, a determination may be made that the new data set also is generated by a platform 102 for a brewing operation. In examples where different platforms 102 are operated by competitors (e.g., competing breweries or other industrial operations), the super-platform 108 may ensure that the same data consumer or other individuals may not have access to similar data of potential competitors.

In some implementations, the super-platform 108 may include a dynamic discovery mechanism that enables the super-platform 108 to interrogate the individual platform 102 to determine its capabilities or any aspects of the platform model 120. In some examples, the individual platform 102 may publish its capabilities or its characteristics to enable the discovery by the super-platform 108. In some examples, a separate service, interface, library, or other layer (e.g., middleware) of the super-platform 108 may be configured to determine the capabilities of individual platforms 102.

The super-platform 108 may also provide a marketplace (not shown) that enables potential data consumers to request various types of the collected data 104 or aggregate data 116. For example, a data consumer may request a particular data set that describes multiple users' use of various platforms 102, such as the types of media content consumed by various users having certain demographic characteristics specified by the data consumer (e.g., age, location, gender, etc.). In some examples, an agent executing on the super-platform 108 may control the data 104, or aggregate data 116, that is provided to data consumer(s). Such control may be subject to data usage restrictions that are specified by one or more of the user, the individual platform(s) 102, or the super-platform 108.

The super-platform 108 may distribute requested portions of aggregate data 116, or the data 104, to one or more data consumer devices 124 associated with data consumer(s). In some implementations, the super-platform 108 may employ a content delivery network (CDN) 122 to deliver the data 104, or the aggregate data 116, to data consumers. A CDN 122 may include multiple delivery nodes, and may enable replication of the data across multiple delivery nodes to provide more efficient, parallelized data delivery or discovery as well as fail-over support, load balancing, scalability, and other advantages. A CDN 122 may also enable replication of data across multiple delivery nodes in examples where the data is dynamic and updated periodically by the individual platforms 102 or the super-platform 108. The distribution model may depend on how frequently the data changes. In some implementations, the data may be delivered to the data consumer device(s) 124 as a dynamically changing data stream. In some implementations, the data may be delivered as substantially static data that changes at a lower frequency (e.g., every hour, every day, etc.).

Ingestion, analysis, and delivery of dynamic data may enable further features of the super-platform 108, such as the ability to analyze data to identify possible security risks. Real-time, dynamic data 104 from different individual platforms 102 may be aggregated to characterize potential threats such as terrorist attacks, natural disasters, epidemics, and so forth. For example, data 104 may be ingested that describes the acquisition of weapons parts or weapons manufacturing materials from distributed sources, vendors, locations, and so forth. Such data may be aggregated to identify the potential threat posed by an entity who is assembling materials to create a weapon. Data 104, or aggregate data 116, may also be analyzed to detect instances in which an attacker or other malicious entity is attempting to trick the super-platform 108 itself into misidentifying potential threats. Pattern recognition or other analysis may be performed on data 104 received from multiple (e.g., widely distributed) individual platforms 102, or on aggregate data 116. In this way, the super-platform 108's data aggregation feature may provide a service, e.g., insight into broader patterns, that may be unavailable from individual platforms 102 that lack the super-platform's more expansive access to data 104. In some examples, the recognized patterns that result from aggregate data analysis may be offered for sale via the marketplace or may be otherwise provided by data consumer(s).

The super-platform 108 may create an adhesive experience for data purchasers or other data consumers, and the adhesive experience may encourage data consumer(s) to return to the super-platform 108 for their future data needs. This adhesive experience may be achieved by providing data consumers with aggregate data 116 or aggregate data analysis products that they may not have access to elsewhere. By sharing or aggregating data 104 generated by multiple individual platforms 102, the super-platform 108 may provide greater value than that of the individual platform(s) 102 alone.

In some implementations, the super-platform 108 may identify a subset of the ingested data 104 that is rare, valuable, important, significant, or otherwise merits analysis and aggregation by the super-platform 108. In some implementations, machine learning techniques may be employed to determine which data 104 to analyze or aggregate. Other automated data pruning methods may also be used.

Various actions may be performed in instances where the ingested data 104 is later determined to be inaccurate or fraudulent, after the data 104 has been distributed to data consumer(s) or after aggregate data 116 based on the data 104 has been distributed. In some examples, the data 104 may be associated with metadata 106 that indicates a source, version, or timestamp for the data 104. The super-platform 108 may provide an interface that enables the data consumer(s) to check existing purchases, or other data distributions, for changes or alerts regarding the integrity of the data 104 generated by various platforms 102. The super-platform 108 may notify the data consumer(s) that previous distributed data may be inaccurate in some way, and may provide the data consumer(s) with the option to received updated data that remediates the flaws of the previously distributed data. Such remediation may be implemented using a content management system with version control. In some examples, the individual platform(s) 102 may inform the super-platform 108 that previously provided data 104 is inaccurate. In some examples, the super-platform 108 may be configured to determine that data 104 previously received at the super-platform 108 is inaccurate.

Figure 3:
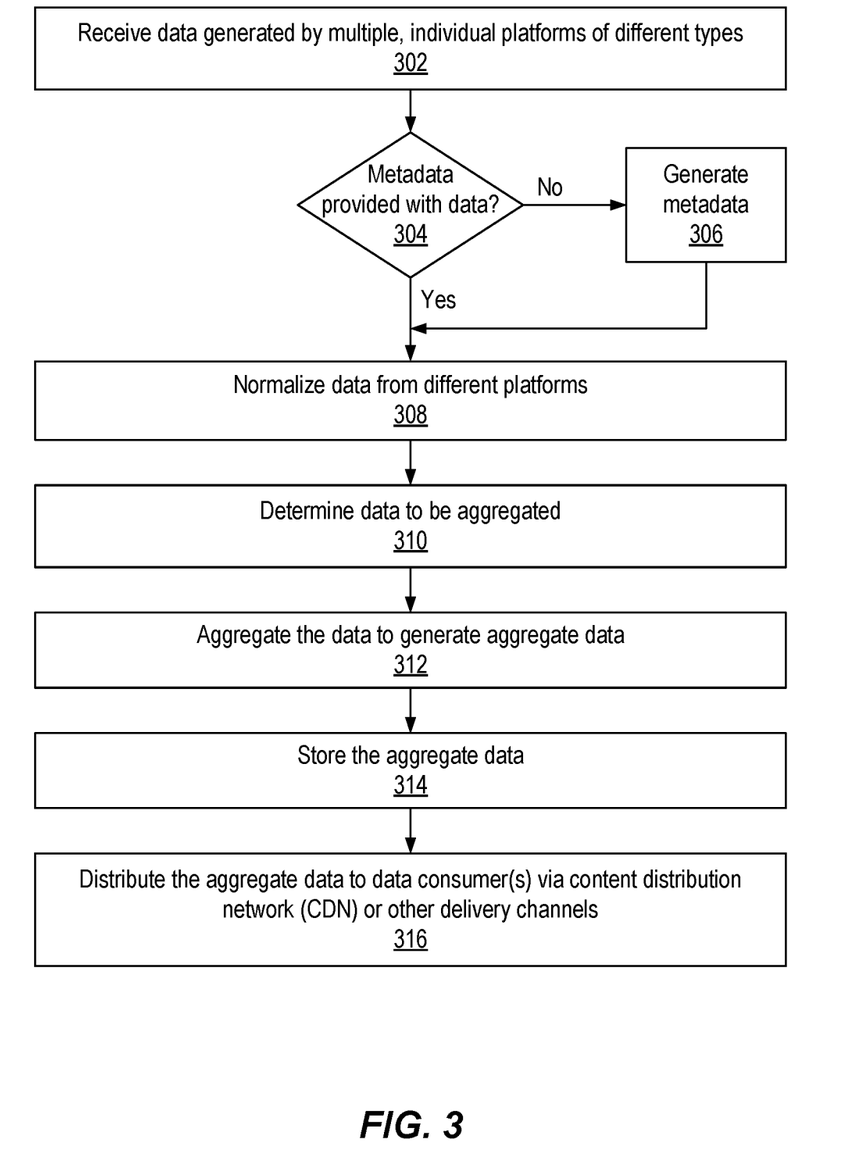
FIG. 3 depicts an example process for aggregating data received from multiple data generating platforms, in accordance with implementations of the present disclosure.

FIG. 3 depicts an example process for aggregating data received from multiple data generating platforms 102, in accordance with implementations of the present disclosure. Operations of the process may be performed by one or more of the super-platform 108, the gateway(s) 110, the aggregation module(s) 114, the modeling module(s) 118, the CDN 122, or other module(s) executing on other computing device(s).

Data 104 may be received (302) from multiple individual platforms 102 of various types as described above. In some implementations, the data 104 may be received in the form of any number of data objects, or streams of data, from the platforms 102.

A determination may be made whether the individual platform(s) 102 have provided metadata 106 that describes the data 104. If not, metadata 106 may be generated (306) for the portion(s) of data 104 that are not delivered with metadata 106 from the platform(s) 102. The process may continue to 308. If the data 104 was provided with metadata 106, the process may continue to 308.

The data 104 may be normalized (308) across different platforms 102, as described above.

At least a portion of the data 104 may be determined (310) to be aggregated. As described above, in some implementations this determination may include identifying portion(s) of the ingested data 104 that include rare, important, or significant information.

The data 104, or at least a portion thereof, is aggregated (312) to generate the aggregate data 116. In some implementations, aggregation may employ the metadata 106 or the semantic data model 212 as described above. In some implementations, the aggregate data 116 is stored (314) in data storage device(s) that are accessible to the super-platform 108.

At least a portion of the aggregate data 116, the data 104, or both the aggregate data 116 and the data 104 may be distributed (316) to one or more data consumer device(s) 124 as described above. In some examples, the data may be distributed using a CDN 122 or other delivery channels.

Figure 4:
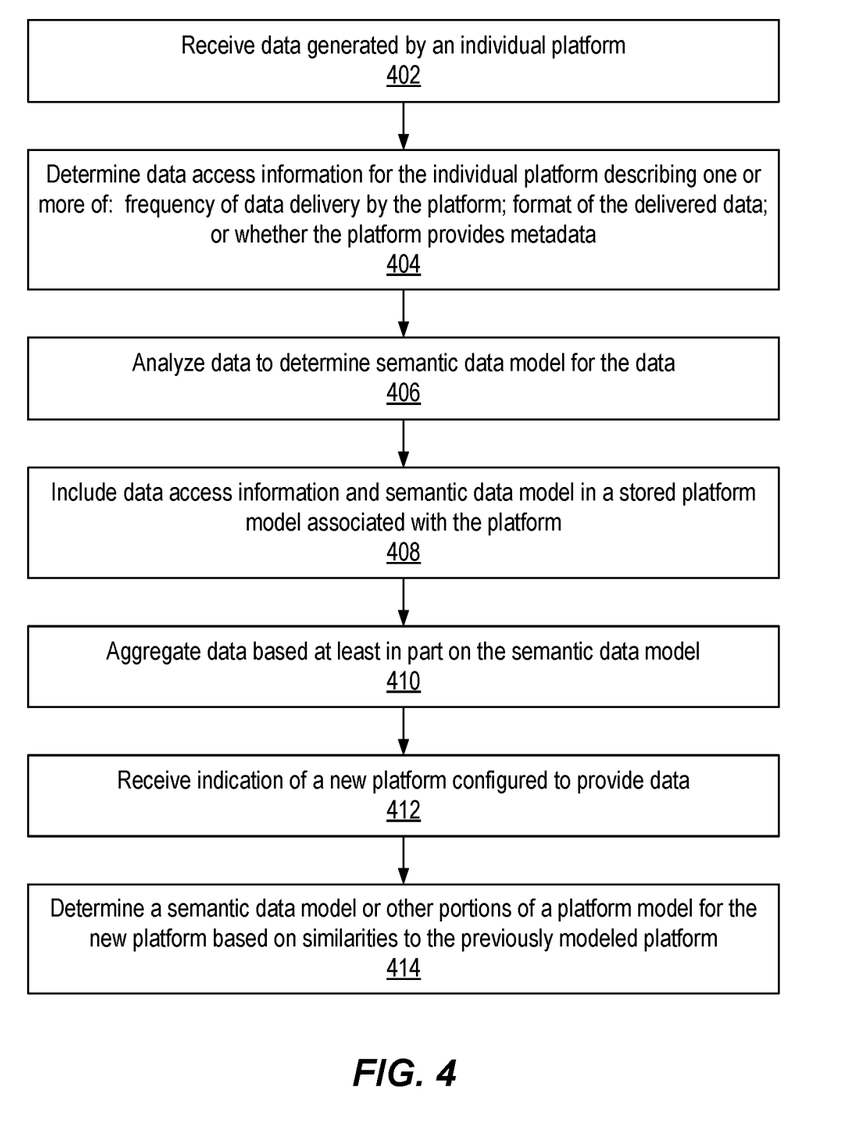
FIG. 4 depicts an example process for determining a platform model for a data generating platform, in accordance with implementations of the present disclosure.

FIG. 4 depicts an example process for determining a platform model 120 for a data generating platform 102, in accordance with implementations of the present disclosure. Operations of the process may be performed by one or more of the super-platform 108, the gateway(s) 110, the aggregation module(s) 114, the modeling module(s) 118, the CDN 122, or other module(s) executing on other computing device(s).

Data 104 generated by a platform 102 may be received (402) by the super-platform 108.

Data access information 204 is determined (404) for the individual platform 102. As described above, the data access information 204 may include one or more of the delivery frequency 206, the format information 208, or the metadata information 210.

The data 104 may be analyzed (406) to determine a semantic data model 212 for the data 104 generated by the platform 102.

The data access information 204 and the semantic data model 212 may be included (408) in the platform model 120 for the individual platform 102, and the platform model 120 may be stored in data storage device(s) accessible by the super-platform 108.

In some implementations, the semantic data model(s) 212 for one or more platforms 102 may be employed to aggregate (410) data 104 received from the platform(s) 102.

In some examples, the super-platform 108 may receive (412) an indication of a newly available platform 102 that may provide data 104 to the super-platform 108.

A semantic data model 212, or other portions of the platform model 120, may be determined (414) for the newly available platform 102. In some examples, the platform model 120 for the new platform 102 may be determined based on similarities between the new platform 102 and one or more currently supported platforms 102 as described above.

Figure 5:
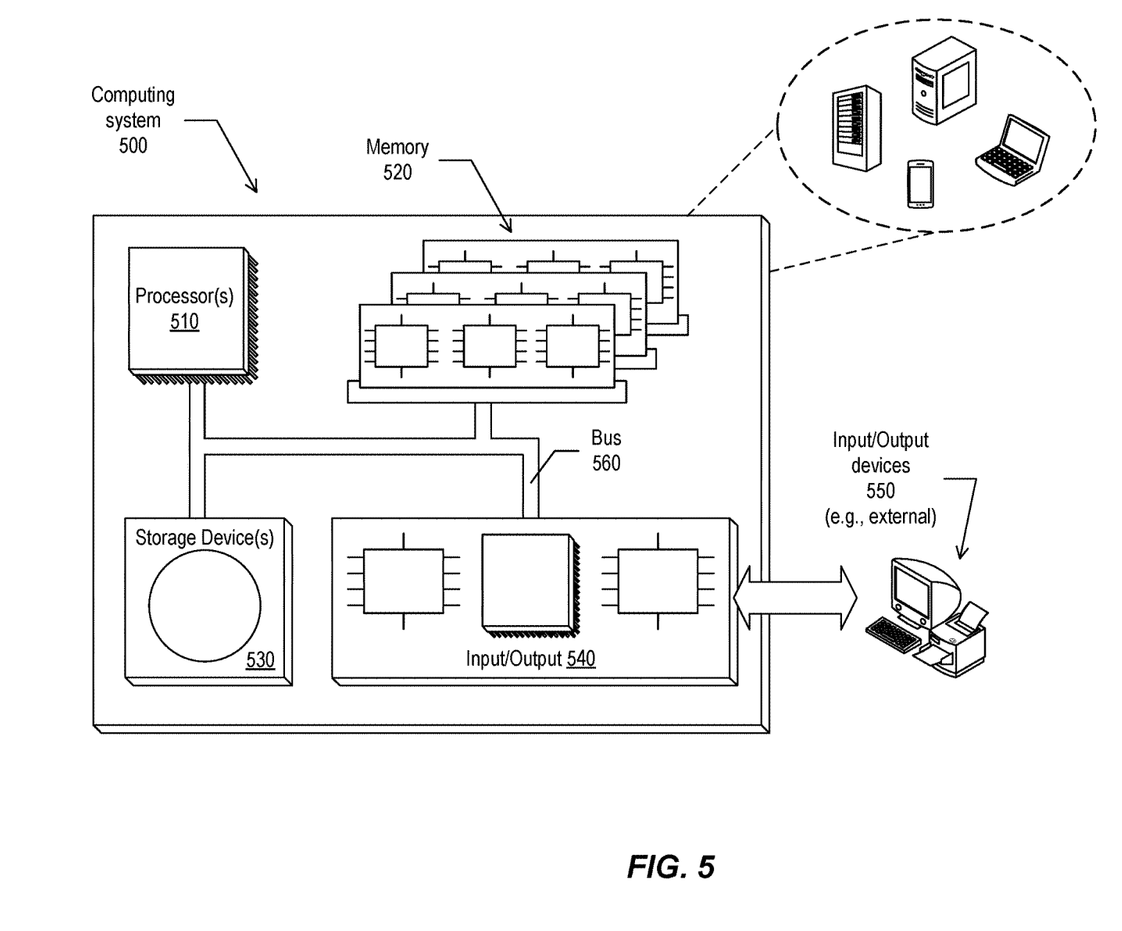
FIG. 5 depicts an example computing system architecture in accordance with implementations of the present disclosure.

FIG. 5 depicts an example computing system 500 in accordance with implementations of the present disclosure. The system 500 may be used for any of the operations described with respect to the various implementations discussed herein. For example, the system 500 may be included, at least in part, in one or more of platforms 102, the super-platform 108, the CDN 122, or the data consumer device(s) 124 described herein. The system 500 may include one or more processors 510, a memory 520, one or more storage devices 530, and one or more input/output (I/O) devices 550 controllable via one or more I/O interfaces 540. Two or more of the components 510, 520, 530, 540, or 550 may be interconnected via at least one system bus 560, which may enable the transfer of data between the various modules and components of the system 500.

The processor(s) 510 may be configured to process instructions for execution within the system 500. The processor(s) 510 may include single-threaded processor(s), multi-threaded processor(s), or both. The processor(s) 510 may be configured to process instructions stored in the memory 520 or on the storage device(s) 530. The processor(s) 510 may include hardware-based processor(s) each including one or more cores. The processor(s) 510 may include general purpose processor(s), special purpose processor(s), or both.

The memory 520 may store information within the system 500. In some implementations, the memory 520 includes one or more computer-readable media. The memory 520 may include any number of volatile memory units, any number of non-volatile memory units, or both volatile and non-volatile memory units. The memory 520 may include read-only memory, random access memory, or both. In some examples, the memory 520 may be employed as active or physical memory by one or more executing software modules.

The storage device(s) 530 may be configured to provide (e.g., persistent) mass storage for the system 500. In some implementations, the storage device(s) 530 may include one or more computer-readable media. For example, the storage device(s) 530 may include a floppy disk device, a hard disk device, an optical disk device, or a tape device. The storage device(s) 530 may include read-only memory, random access memory, or both. The storage device(s) 530 may include one or more of an internal hard drive, an external hard drive, or a removable drive.

One or both of the memory 520 or the storage device(s) 530 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 500. In some implementations, the CRSM may include a data store that provides storage of computer-readable instructions or other information in a non-transitory format. The CRSM may be incorporated into the system 500 or may be external with respect to the system 500. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 510 and the memory 520 may be supplemented by, or incorporated into, one or more application-specific integrated circuits (ASICs).

The system 500 may include one or more I/O devices 550. The I/O device(s) 550 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 550 may also include one or more output devices such as a display, LED(s), an audio output device (e.g., a speaker), a printer, a haptic output device, and so forth. The I/O device(s) 550 may be physically incorporated in one or more computing devices of the system 500, or may be external with respect to one or more computing devices of the system 500.

The system 500 may include one or more I/O interfaces 540 to enable components or modules of the system 500 to control, interface with, or otherwise communicate with the I/O device(s) 550. The I/O interface(s) 540 may enable information to be transferred in or out of the system 500, or between components of the system 500, through serial communication, parallel communication, or other types of communication. For example, the I/O interface(s) 540 may comply with a version of the RS-232 standard for serial ports, or with a version of the IEEE 1284 standard for parallel ports. As another example, the I/O interface(s) 540 may be configured to provide a connection over Universal Serial Bus (USB) or Ethernet. In some examples, the I/O interface(s) 540 may be configured to provide a serial connection that is compliant with a version of the IEEE 1394 standard.

The I/O interface(s) 540 may also include one or more network interfaces that enable communications between computing devices in the system 500, or between the system 500 and other network-connected computing systems. The network interface(s) may include one or more network interface controllers (NICs) or other types of transceiver devices configured to send and receive communications over one or more networks using any network protocol.

Computing devices of the system 500 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 500 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device (s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

The features described may be implemented in digital electronic circuitry or in computer hardware, software, or any combinations of hardware and software. The features may be implemented in at least one computer program product that is tangibly embodied in an information carrier (e.g., a machine-readable storage device) for execution by a programmable processor. The method or process steps may be performed by a programmable processor executing instructions to perform functions of the described implementations by operating on input data and generating output. The described features may be implemented in one or more computer programs that are executable on a programmable system including at least one programmable processor coupled to receive data and instructions from, and to transmit data and instructions to, a data storage system, at least one input device, and at least one output device. A computer program may include a set of instructions that can be used, directly or indirectly, in a computer to perform a certain activity or bring about a certain result. A computer program may be written in any form of programming language, including compiled or interpreted languages, and it may be deployed in any form, including as a stand-alone program or as a module suitable for use in a computing environment.

The logic flows depicted in the figures do not require the particular order shown, or any particular sequential order, to achieve desirable results. In some implementations, other steps may be provided or steps may be eliminated from the described flows. Moreover, the steps may be performed in parallel or serially with respect to other steps. The systems depicted in the figures do not require the particular components, or the particular arrangement of components, shown in the figures. In some implementations, the various systems may include more or fewer components than shown in the figures, and components may be arranged differently to achieve desirable results. Accordingly, implementations other than those explicitly depicted in the figures or described herein are within the scope of the following claims.

Although example UIs herein may include various elements in an example arrangement, implementations are not limited to these examples. Any of the UIs described herein, or the various screens thereof, may include any number of elements of any type, in any arrangement. UI elements may include any number of controls such as buttons, radio buttons, sliders, menus, lists, and so forth. UI elements may include any number of dialogs to enable entry of any type of information. A UI may be presented in a single screen, page, or window, or in multiple screens, pages, or windows. A UI may present information visually. A UI may also present information as audio output, haptic output (e.g., via movements of a device), or through other methods.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method performed by at least one processor, the method comprising:
   receiving, by a super-platform executed by the at least one processor, data objects generated by a plurality of platforms that provide at least two different types of services, the super-platform receiving data objects from each of a plurality of platforms;
   providing, by the super-platform, for each respective platform, a platform model comprising a platform identifier that uniquely identifies the respective platform, data access information that describes how to access the data objects generated by the respective platform, and a semantic data model that describes the data objects generated by the respective platform, wherein the semantic data model comprises a directed graph that describes relationships between pairs of the data objects generated by the respective platform;
   adding, by the super-platform, at least one platform through dynamically adapting to the at least one platform by determining how a respective instance of data provided by the at least one platform fits into a semantic data model that describes previously ingested data from another platform;
   aggregating, by the super-platform, at least two of the data objects from at least two of the plurality of platforms to generate one or more aggregate data objects, wherein the aggregating is based on: i) metadata that describes the at least two data objects, and ii) respective semantic data models that each describe the data objects generated by respective platforms of the at least two platforms, and wherein the aggregating of the at least two data objects is based at least partly on one or more relationships that include the at least two data objects and that are described in the respective directed graph for each of the at least two platforms; and
   providing, by the super-platform, the one or more aggregate data objects to at least one data consumer device.

2. The method of claim 1, wherein one or more of the data objects include data associated with an end-user of one or more of the plurality of platforms.

3. The method of claim 1, further comprising:
determining, by the at least one processor, that a particular data object from one of the plurality of platforms includes data not included in other data objects from other platforms; and
including, by the at least one processor, the particular data object in the at least some of the data objects that are aggregated to generate the one or more aggregate data objects.

4. The method of claim 1, further comprising:
normalizing, by the at least one processor, the data from different platforms of the plurality of platforms to provide one or more of a common data format, a common data style, or a common data type for the data.

5. The method of claim 4, wherein:
at least two platforms of the plurality of platforms generate data associated with a same end-user;
the at least two platforms employ at least two different user identifiers to identify the same end-user; and
normalizing the data further comprises associating a common user identifier with the data generated by the at least two platforms.

6. The method of claim 1, wherein at least a portion of the metadata is received from one or more of the plurality of platforms.

7. The method of claim 1, further comprising:
generating, by the at least one processor, at least a portion of the metadata based on one or more of:
a natural language analysis of the data;
a pattern matching analysis of the data; or
context information associated with one or more of the plurality of platforms or an end-user of the plurality of platforms.

8. The method of claim 1, wherein the plurality of platforms include at least two of:
an e-commerce platform configured to provide an e-commerce service;
a retail platform configured to support retail operations of a physical store;
a media platform configured to provide an online media service;
a mobile computing device;
an Internet of Things (IoT) computing device; or
an in-vehicle computer.

9. The method of claim 1, further comprising:
analyzing, by the at least one processor, data included in one or more of the data objects to determine a semantic data model for one of the plurality of platforms; and
employing, by the at least one processor, the semantic data model in aggregating at least some of the data objects from the plurality of platforms to generate the one or more aggregate data objects.

10. The method of claim 9, further comprising:
receiving, by the at least one processor, an indication of a newly available platform configured to provide data; and
based at least partly on a similarity between the newly available platform and one of the plurality of platforms, determining, by the at least one processor, a semantic data model for the newly available platform.

11. A system comprising:
at least one processor; and
a memory communicatively coupled to the at least one processor, the memory storing instructions which, when executed by the at least one processor, cause the at least one processor to perform operations comprising:

receiving, by a super-platform, data objects generated by a plurality of platforms that provide at least two different types of services, the super-platform receiving data objects from each of a plurality of platforms;
providing, by the super-platform, for each respective platform, a platform model comprising a platform identifier that uniquely identifies the respective platform, data access information that describes how to access the data objects generated by the respective platform, and a semantic data model that describes the data objects generated by the respective platform, wherein the semantic data model comprises a directed graph that describes relationships between pairs of the data objects generated by the respective platform;
adding, by the super-platform, at least one platform through dynamically adapting to the at least one platform by determining how a respective instance of data provided by the at least one platform fits into a semantic data model that describes previously ingested data from another platform;
aggregating, by the super-platform, at least two of the data objects from at least two of the plurality of platforms to generate one or more aggregate data objects, wherein the aggregating is based on: i) metadata that describes the at least two data objects, and ii) respective semantic data models that each describe the data objects generated by respective platforms of the at least two platforms, and wherein the aggregating of the at least two data objects is based at least partly on one or more relationships that include the at least two data objects and that are described in the respective directed graph for each of the at least two platforms; and
providing, by the super-platform, the one or more aggregate data objects to at least one data consumer device.

12. The system of claim 11, wherein one or more of the data objects include data associated with an end-user of one or more of the plurality of platforms.

13. The system of claim 11, the operations further comprising:
determining that a particular data object from one of the plurality of platforms includes data not included in other data objects from other platforms; and
including the particular data object in the at least some of the data objects that are aggregated to generate the one or more aggregate data objects.

14. The system of claim 11, the operations further comprising:
normalizing the data from different platforms of the plurality of platforms to provide one or more of a common data format, a common data style, or a common data type for the data.

15. The system of claim 14, wherein:
at least two platforms of the plurality of platforms generate data associated with a same end-user;
the at least two platforms employ at least two different user identifiers to identify the same end-user; and
normalizing the data further comprises associating a common user identifier with the data generated by the at least two platforms.

16. One or more non-transitory computer-readable storage media storing instructions which, when executed by at least one processor, cause the at least one processor to perform operations comprising:

receiving, by a super-platform, data objects generated by a plurality of platforms that provide at least two different types of services, the super-platform receiving data objects from each of a plurality of platforms;

providing, by the super-platform, for each respective platform, a platform model comprising a platform identifier that uniquely identifies the respective platform, data access information that describes how to access the data objects generated by the respective platform, and a semantic data model that describes the data objects generated by the respective platform, wherein the semantic data model comprises a directed graph that describes relationships between pairs of the data objects generated by the respective platform;

adding, by the super-platform, at least one platform through dynamically adapting to the at least one platform by determining how a respective instance of data provided by the at least one platform fits into a semantic data model that describes previously ingested data from another platform;

aggregating, by the super-platform, at least two of the data objects from at least two of the plurality of platforms to generate one or more aggregate data objects, wherein the aggregating is based on: i) metadata that describes the at least two data objects, and ii) respective semantic data models that each describe the data objects generated by respective platforms of the at least two platforms, and wherein the aggregating of the at least two data objects is based at least partly on one or more relationships that include the at least two data objects and that are described in the respective directed graph for each of the at least two platforms; and providing, by the super-platform, the one or more aggregate data objects to at least one data consumer device.

17. The one or more non-transitory computer-readable storage media of claim 16, wherein at least a portion of the metadata is received from one or more of the plurality of platforms.

18. The one or more non-transitory computer-readable storage media of claim 16, the operations further comprising:
generating at least a portion of the metadata based on one or more of:
a natural language analysis of the data;
a pattern matching analysis of the data; or
context information associated with one or more of the plurality of platforms or an end-user of the plurality of platforms.

19. The one or more non-transitory computer-readable storage media of claim 16, wherein the plurality of platforms include at least two of:
an e-commerce platform configured to provide an e-commerce service;
a retail platform configured to support retail operations of a physical store;
a media platform configured to provide an online media service;
a mobile computing device;
an Internet of Things (IoT) computing device; or
an in-vehicle computer.

20. The one or more non-transitory computer-readable storage media of claim 16, the operations further comprising:
analyzing data included in one or more of the data objects to determine a semantic data model for one of the plurality of platforms; and
employing the semantic data model in aggregating at least some of the data objects from the plurality of platforms to generate the one or more aggregate data objects.

* * * * *